(12) United States Patent
Fontijn et al.

(10) Patent No.: US 7,328,352 B2
(45) Date of Patent: Feb. 5, 2008

(54) APPARATUS AND METHOD FOR READING OR WRITING USER DATA

(75) Inventors: Wilhelmus Fransiscus Johannes Fontijn, Eindhoven (NL); Antonius Adriaan Maria Staring, Eindhoven (NL); Alexandre Sinitsyn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 795 days.

(21) Appl. No.: 10/266,323

(22) Filed: Oct. 8, 2002

(65) Prior Publication Data

US 2003/0091186 A1 May 15, 2003

(30) Foreign Application Priority Data

Oct. 12, 2001 (EP) .................. 01203907

(51) Int. Cl.
 *H04L 9/00* (2006.01)
 *H04K 1/00* (2006.01)
(52) U.S. Cl. .................. 713/193; 380/37
(58) Field of Classification Search .......... None
 See application file for complete search history.

(56) References Cited

U.S. PATENT DOCUMENTS

| | | | |
|---|---|---|---|
| 5,615,264 A * | 3/1997 | Kazmierczak et al. | 705/52 |
| 6,742,116 B1 * | 5/2004 | Matsui et al. | 713/171 |
| 6,865,431 B1 * | 3/2005 | Hirota et al. | 700/94 |
| 6,911,974 B2 * | 6/2005 | Asano et al. | 345/204 |
| 6,938,162 B1 * | 8/2005 | Nagai et al. | 713/189 |
| 6,950,941 B1 * | 9/2005 | Lee et al. | 713/193 |
| 7,181,624 B2 * | 2/2007 | Asano et al. | 713/178 |
| 7,225,339 B2 * | 5/2007 | Asano et al. | 713/193 |
| 2002/0094088 A1 * | 7/2002 | Okaue | 380/278 |
| 2002/0154779 A1 * | 10/2002 | Asano et al. | 380/277 |
| 2002/0164034 A1 * | 11/2002 | Asano et al. | 380/278 |
| 2002/0169971 A1 * | 11/2002 | Asano et al. | 713/193 |
| 2003/0185396 A1 * | 10/2003 | Asano et al. | 380/277 |
| 2005/0044083 A1 * | 2/2005 | Sako | 707/100 |

FOREIGN PATENT DOCUMENTS

| | | |
|---|---|---|
| EP | 1052850 A2 | 11/2000 |
| EP | 1052850 A2 * | 11/2000 |
| WO | WO0055861 | 9/2000 |

* cited by examiner

Primary Examiner—Christopher Revak
(74) Attorney, Agent, or Firm—Michael E. Belk (57) ABSTRACT

An apparatus for reading or writing user data stored block-wise in encrypted form on a storage medium. The apparatus includes a command interface for receiving and interpreting a read (or write) command. The read command includes a user data information specifying which user data are to be read. A reader reads the user data and a related encryption indicator from a block of the storage medium. The encryption indicator indicates if said user data is encrypted or not. The reader further reads a related key data identifier specifying which key data to use for decrypting the user data if said encryption indicator indicates that said user data are encrypted. A decryptor decrypts the user data using the key data.

24 Claims, 7 Drawing Sheets

FIG.1

| Byte Number | Bit Number | Content | |
|---|---|---|---|
| 16 | 0 | Encryption_Flag | |
|  | 1..7 | Asset_ID | |
| 17 | 0..7 | | |
| 18 | 0 | End-of-Record | S u b m o d e |
|  | 1 | Video | |
|  | 2 | Audio | |
|  | 3 | Data | |
|  | 4 | Trigger | |
|  | 5 | Form (0 = Form 1, 1 = Form 2) | |
|  | 6 | Real-time block | |
|  | 7 | End-of-File | |
| 19 | 0..7 | Reserved | |
| 20 | 0 | Encryption_Flag | |
|  | 1..7 | Asset_ID | |
| 21 | 0..7 | | |
| 22 | 0..7 | Submode | |
| 23 | 0..7 | Reserved | |

FIG.2

| Byte Number | Bit Number | Content |
|---|---|---|
| 16 | 0 | Encryption_Flag |
|  | 1..7 | Asset_ID |
| 17 | 0..7 | |
| 18 | 0..7 | Submode |
| 19 | 0..7 | Reserved |
| 20 | | Initial Vector |
| 21 | | |
| 22 | | Submode |
| 23 | | Reserved |

APPARATUS AND METHOD FOR READING OR WRITING USER DATA

The invention relates to an apparatus for reading user data stored block-wise in encrypted form on a storage medium, the storage of which is divided into blocks. The invention relates further to an apparatus for writing user data block-wise in encrypted form onto a storage medium, to corresponding methods of reading or writing user data, to a medium and to a computer program product. The invention refers particularly to the protection of information on recordable storage media, particularly optical recording media like a CD or a DVD for storing any kind of data like video data or audio data.

If user data, e.g. video data, audio data, software or application data, is stored on a recording medium in encrypted form, it is most often required that an authorized application can read and use said user data, if allowed, from recording medium without the need to retrieve the decryption key from a separate location such as the internet. Hence, the decryption key has to be stored on the medium, on which the encrypted user data is stored. In order to prevent unauthorized access to the decryption key, e.g. by unauthorized applications, the decryption key is generally hidden on the storage medium such that unauthorized applications cannot read the decryption key. Known methods for hiding the decryption key on the storage medium are the Content Scrambling System (CSS) and Content Protection for Recordable Media (CPRM).

Generally, the storage of a storage medium is divided into blocks (or sectors), and the content of a file is stored in one or more of such blocks. A read or a write command generally only specifies a logical block address, but not the name of the file that shall be read or written. Since usually each file, but not each block, has its own encryption or decryption key, an apparatus for reading or writing user data that receives a read or write command, e.g. from a PC application, cannot determine which key data to use for decryption or encryption since it does not receive the name of the file from the read or write command.

One possible solution would be to use the same key data for all user data stored on a storage medium. However, this solution is not acceptable if different keys are required for different files, as is needed in most applications.

In DVD-Video each block has its own key, stored in the sector header. However, said solution requires a lot of storage capacity for the keys which storage is thus not available for user data.

Another possible solution would be to use a separate command to inform the reading or writing apparatus which key data to use in future read or write commands. However, this solution is also not acceptable in general, because it shall be possible for several applications to send commands to the reading or writing apparatus concurrently, each application reading and/or writing different files using different keys. With such a solution only a single application would be able to access the reading or writing apparatus, but other applications would have to be excluded unless they read the same file using the same key.

It is therefore an object of the present invention to provide an apparatus for reading and an apparatus for writing user data as well as corresponding methods of reading or writing user data which overcome the above mentioned problems but provide a high level of protection, in particular of the key data, against theft through hacking of a PC application.

This object is achieved by providing an apparatus for reading comprising:

a command interface for receiving and interpreting a read command, said read command including a user data information specifying which user data are to be read, reading means for reading user data and a related encryption indicator from a block of said storage medium, said encryption indicator indicating if said user data is encrypted or not, said reading means being further adapted for reading a related key data identifier specifying which key data to use for decrypting said user data if said encryption indicator indicates that said user data are encrypted, decryption means for decrypting said user data using said key data, and output means for outputting said decrypted user data.

This object is further achieved by an apparatus for writing user data comprising:

a command interface for receiving and interpreting a write command, said write command including a user data information specifying which user data are to be written and a related encryption indicator indicating if said user data shall be written in encrypted form or not, encryption means for encrypting said user data using key data and writing means for writing said user data, said encryption indicator and, if said user data are encrypted, a key data identifier specifying which key data are used for encrypting said user data.

The present invention is based on the idea to store extra information together with the related user data allowing the apparatus for reading said user data to recognize if said user data are encrypted or not and which key data have been used for encrypting said user data. This extra information allows the apparatus for reading to retrieve the related and correct key data for decrypting said user data before outputting it. Similarly, an apparatus for writing user data stores, in addition to the user data, an encryption indicator indicating if said user data are encrypted and, if required, a key data identifier. Since the key data itself are not known to a PC application finally receiving the user data, said key data are securely protected against theft by a hacker. In addition, re-encryption of user data can be implemented by the apparatus for reading before transmitting it to a PC application, thus further protecting the user data against unwanted access during transmission.

According to a preferred embodiment the key data identifier is stored in the header or sub-header of a block storing user data encrypted by use of the key data specified by said key data identifier. Preferably this is done in each block or sector in which encrypted user data is stored. In addition in the header or sub-header of each block said encryption indicator is included.

Thus, even if the apparatus for reading does not know the file name which would allow it to identify the corresponding key data to be used for decrypting the content of said file, the apparatus for reading immediately knows, when reading a block, which key data are to be used for decrypting the user data stored in said block. This is particularly important since commands received by the apparatus for reading or writing, e.g. from a PC application, particularly a read, play or write command, does not specify the file name, but only the logical block address addressing the block to be accessed and the amount of data to be read or written.

According to an alternative embodiment the key data identifier is stored next to the block the user data of which are to be read, in particular in a sub-channel of a main data channel. The key data identifier may thus be stored in the method of data modulation.

If the method of encryption used for encrypting user data incorporates an initialization vector (IV), which may vary between blocks or sectors, it is proposed to store this initialization vector inside the header or sub-header of the block also. In case of re-encryption by the apparatus for reading a deducible initialization vector is needed as the number in this field should also be available to any application decrypting the data that does not have access to the header or sub-header. For instance, the block sequence number, i.e. the number of the position of a particular block in the sequence of blocks constituting a file, could be used. The initialization vector or the space reserved for the initialization vector can also be used to contain encryption control information, e.g. information on partially encrypted blocks. The re-encrypted stream could also use a constant initialization vector, which then is the same for all data blocks.

According to another preferred embodiment the key data are stored in encrypted form on the storage medium which will then be read by the reading means since they are specified by the key data identifier stored together with the user data. In addition, decryption means are provided for decrypting the encrypted key data so that they can be used for decrypting the read decrypted user data.

According to still another embodiment of the invention re-encryption is done in the apparatus for reading after decrypting the user data read from the storage medium and before outputting the user data in re-encrypted form. In order to enable the apparatus for reading to re-encrypt the decrypted user data a re-encryption key data information is included in a read command specifying which re-encryption key data to use for re-encryption.

Advantageously the key data identifier does not only specify the key data which are to be used for decrypting the user data stored in the accessed block on the storage medium, but further specifies additional information, in particular rights information, associated with the user data stored in the accessed block, said additional information being stored in a key locker on said storage medium. Also the specified key data is preferably stored in a look-up table contained in the key locker on the storage medium. The key data identifier can thus be regarded as pointer into said look-up table storing different key data for different blocks.

Particularly for recordable storage media a combination of sector level storage of key data and a file level encryption may in addition be provided according to the invention. Preferably the invention uses the CD-ROM XA specification such that compatibility with this specification is achieved.

The invention will now be explained in more detail with reference to the drawings, in which.

Figure 1:
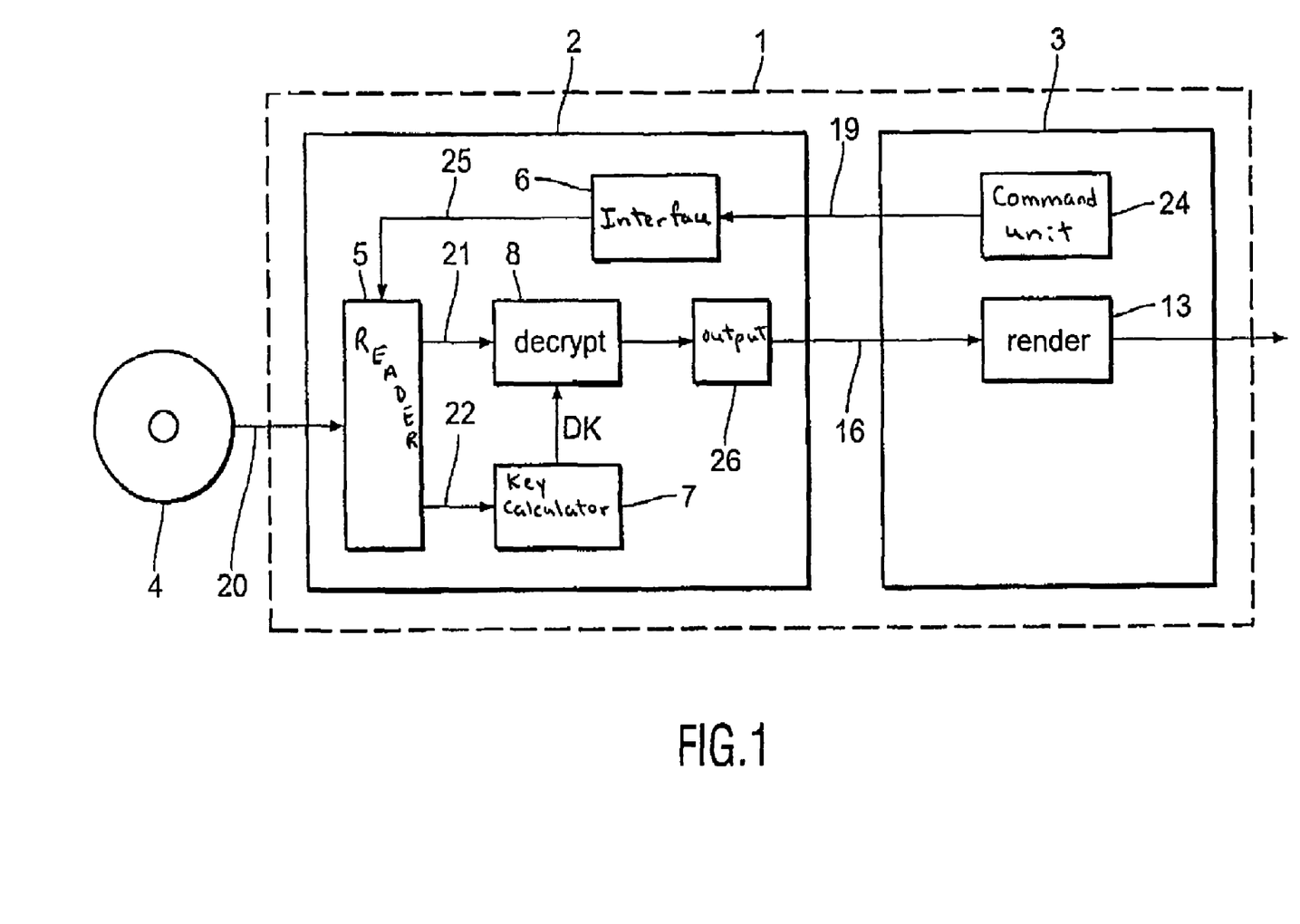
FIG. 1 shows a block diagram of a reproducing apparatus according to the invention.

In FIG. 1 a first embodiment of a reproducing apparatus 1 according to the invention is illustrated. The reproducing apparatus 1 may be implemented on a personal computer comprising a drive unit 2, i.e. a reading apparatus, and an application unit 3 for running an application. If a user intends to reproduce user data stored on a recording medium 4 like a DVD-ROM, e.g. in order to replay video data stored on a DVD in MPEG-format, the medium 4 is inserted into the drive 2 where data 20 including said user data 21 and key data 22 are read by reading means 5. It should be noted that both the user data 21 and the key data 22 are stored on the medium 4 in encrypted form, and further, that there are different ways of encrypting user data and key data before storing it on the recording medium, but that it is not relevant for the present invention which particular way of encryption is used.

The storage of the medium 4 is divided into logical blocks each being addressable by a logical block address. Each file, the data of which are stored in one or more of such blocks, is associated with an encryption key, but not each block. Thus, the reading means 5 need to be informed about which encryption key to use for decrypting the user data 21 read from the medium 4.

If the application unit 3 requests the drive 2 to read certain user data 21, i.e. a certain file, from the medium 4 a command unit 24 sends a read command 19 to the command interface 6. The read command 19 which may be established in conformity with the SCSI Multi Media Commands-2 (MMC-2) or the SCSI-3 Block Commands (SBC) thereby includes the logical block address indicating the start of reading from the medium 4 and the amount of data to be read. This information 25 is forwarded to the reading means 5 for enabling it to read the requested data 20 including the user data 21.

When accessing the block or blocks on the medium 4 as indicated by the logical block address the reading means 5 do not only read the requested user data 21 but also, at first, an encryption indicator indicating if said user data 21 is encrypted or not. If said encryption indicator, which may be the first field of a header or sub-header of a block, indicates that the user data is encrypted a key data identifier specifying which key data to use for decrypting said user data is read from the header or sub-header of the same block. The key data itself can be stored in encrypted form on the storage medium, e.g. in a table of content (TOC) contained in a key locker, which can then be accessed by the reading means 5 using said key data identifier.

The read key data 22 are after reading inputted into a key calculation unit 7 for calculating the decryption key DK required by the decryption unit 8 for decrypting the read user data 21 provided from the reading means 5. The decryption key DK is identical to an encryption key which has been used for encrypting the user data before storing it on the medium 4 or is a corresponding key to this encryption key.

After decryption the decrypted user data 16 is transmitted to the application unit 3 by output means 26. Thereafter the requested user data can be completely reproduced and rendered for playback by render unit 13.

Figure 2:
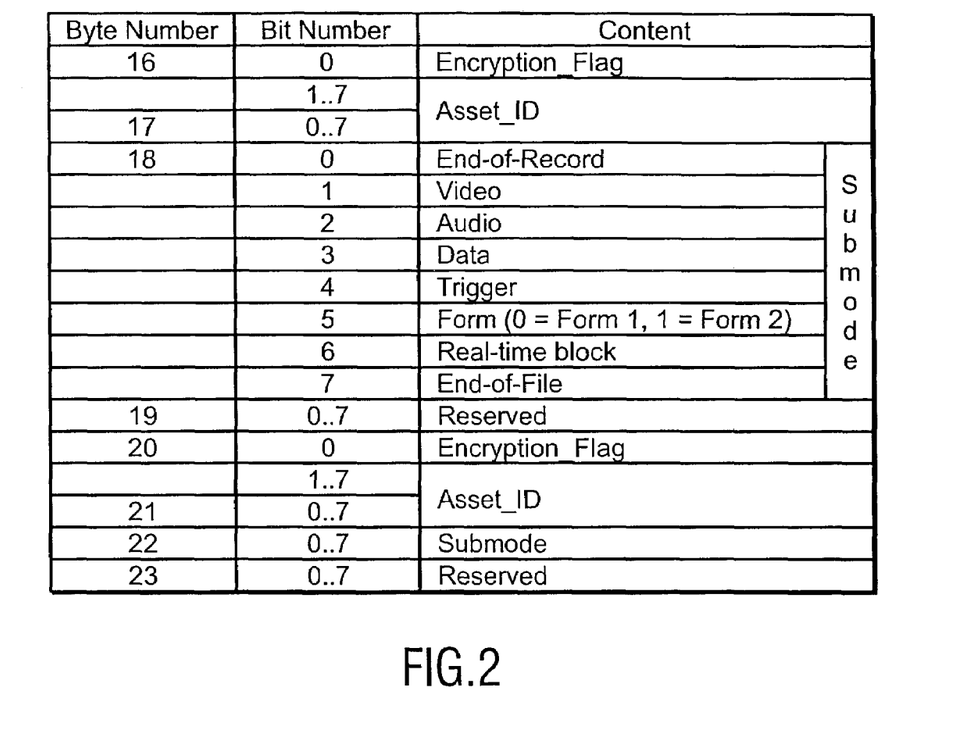
FIG. 2 shows a sub-header for CD-ROM XA.

An embodiment of a sub-header according to the invention is shown in FIG. 2. Therein a sub-division of the sub-header for use within a CD system enabling the use of a generic UDF (Universal Disc File) file system reader. The first bit of the first byte of the subheader is called the encryption flag, e.g. is used as the encryption indicator. If this flag is set the content of the sector is encrypted and the remainder of byte 16 and the complete byte 17 is used to store the Asset_ID that identifies the encryption key, i.e. which is used as the key data identifier according to the invention.

The content of byte 18 includes different data for the sub-mode as described in the CD-ROM XA specification. If the encryption flag is set to zero all bits in bytes 16 and 17 shall be set to zero. Byte 19 is reserved and could be used to store other data. The content of bytes 16 to 19 is repeated in bytes 20 to 23 as specified in the CD-ROM XA specification. This sub-division is expected to be fully compatible with CD-ROM XA aware systems.

Figure 3:
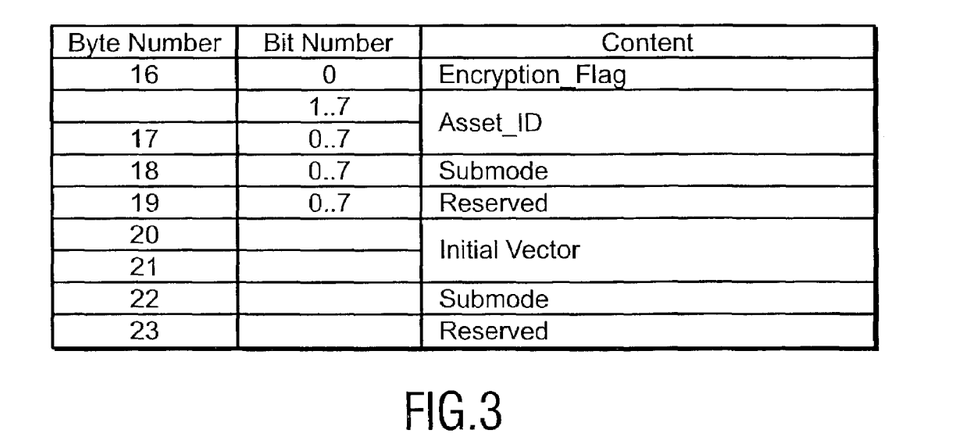
FIG. 3 shows another sub-header for CD-ROM XA.

Another embodiment of a sub-header is shown in FIG. 3. Therein only bytes 20 and 21 differ compared to the sub-header shown in FIG. 2. These two bytes are used to store a two byte initial vector (IV). Such initial vectors are used when encrypting a large block of data in order to obtain improved security by employing an encryption mode called cipher block chaining. Therein the first cipher block having no preceding block an initial vector is used which can be chosen independently of the data. If the block sequence number is used for an initial vector the use of two bytes would suffice for files up to 128 MB before the value of the initial vector switches to zero again. However, other sector sizes than two kilobytes are also be used.

This sub-division is expected to be compatible with almost every CD-ROM XA aware system. The fact that the information in bytes 16 to 19 is no longer present in duplicate may not involve a problem in CD systems. First, all sectors in the same block request will have the same asset-ID (key data identifier). Second, the block sequence number will be one more or one less than the previous or next sector in the same request. The content of the sub-header can always be reconstructed and a defect in a sub-header will be absent in a new copy of the file.

There may be several further variations for use of the sub-header. For instance, byte 19 may be used for the initial vector in addition to bytes 20 and 21. Still further, bytes 22 and 23 of the sector may also be used for the initial vector.

In a CD-ROM XA compliant system the identification of the key data could also be the combination of the file number and channel number fields in the sub-header which are usually bytes 16 and 17 of the sub-header of a sector. The initial vector could be in the byte 19, reserved for coding information or, if one byte is not enough, in the repetition of the file number and channel byte.

Figure 4:
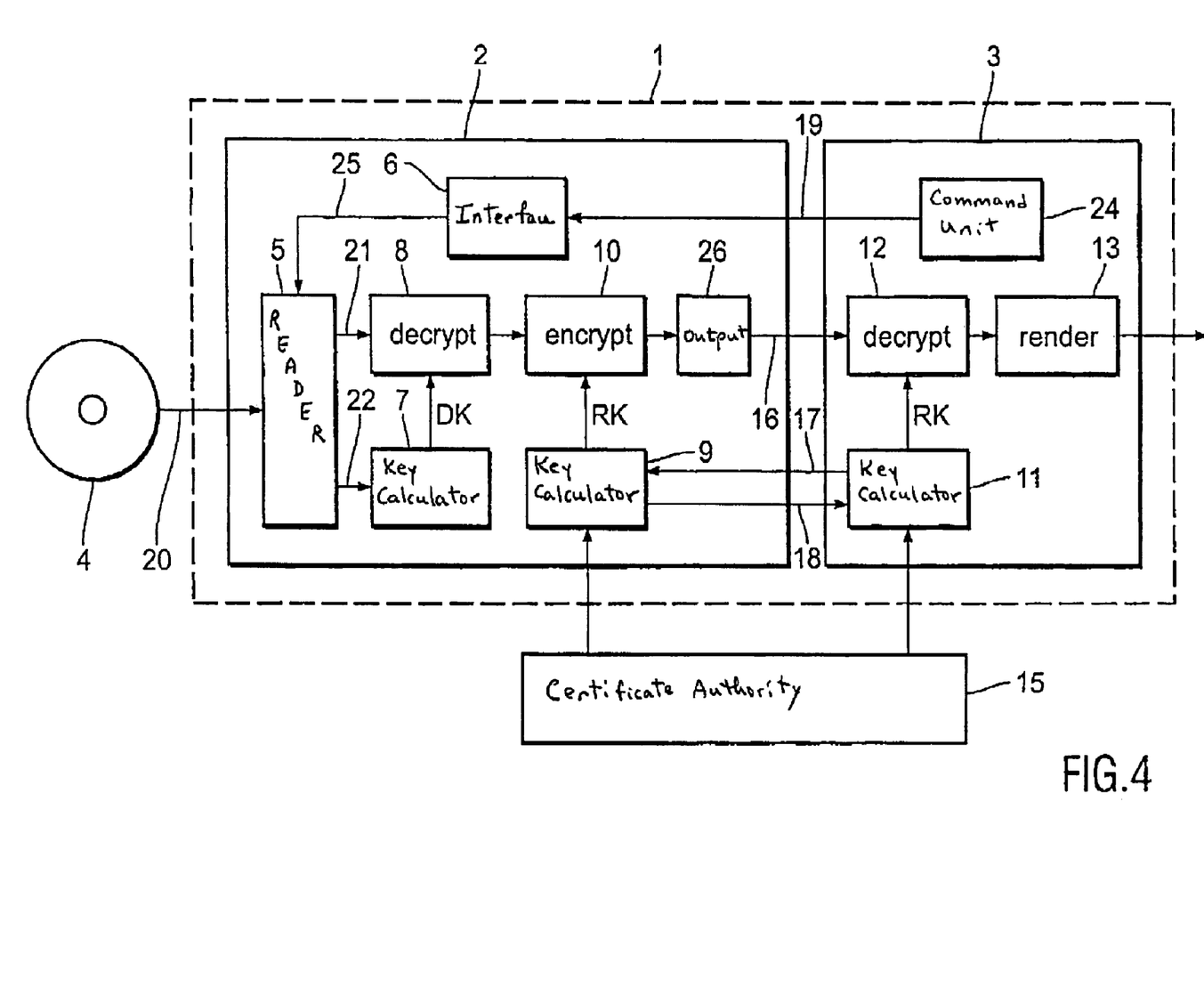
FIG. 4 shows a block diagram of a second embodiment of a reproducing apparatus.

Another embodiment of a reproducing apparatus 1 is shown in FIG. 4. Therein re-encryption is used within the drive unit 2 before outputting user data to the application unit 3. As in the first embodiment shown in FIG. 1 an information as to the user data to be read from the medium 4 is included in the read command 19. However, after decryption of the user data 21 by the calculated decryption key DK in the decryption unit 8 the user data, now being in the clear, are re-encrypted by a re-encryption unit 10 using a regularly changing re-encryption key RK. In order to know which re-encryption key RK to use for re-encryption a re-encryption key can be requested from a certification authority 15 or generated on demand by the drive unit 2. After re-encryption of the user data by re-encryption unit 10 it (16) is outputted by the output unit 26 to the application unit 3.

Since the re-encryption key RK has also to be known to the application unit 3 in order to decrypt the user data therein, a secure authenticated channel 17, 18 between the drive unit 2 and the application unit 3 is established. One way to do this is to authorize the application running on the application unit 3 its public key is certified by a certification authority 15. Said public key is then used to establish the secure authenticated channel 17. The key calculation unit 9 may then verify the certification authority's signature.

After final authorization of the application the encrypted re-encryption key RK or any other data relating to the re-encryption key RK are transmitted from the key calculation unit 9 to the key calculation unit 11 of the application unit 3 via the secure authenticated channel 18. The key calculation unit 11 is thus able to calculate the re-encryption key RK such that the decryption unit 12 can decrypt the re-encrypted user data 16. It should be noted that the transmission lines 16, 17 and 18 are included in the bus of the reproducing apparatus 1. After decrypting the user data in decryption unit 12 it can be completely reproduced and rendered for playback by render unit 13.

Figure 5:
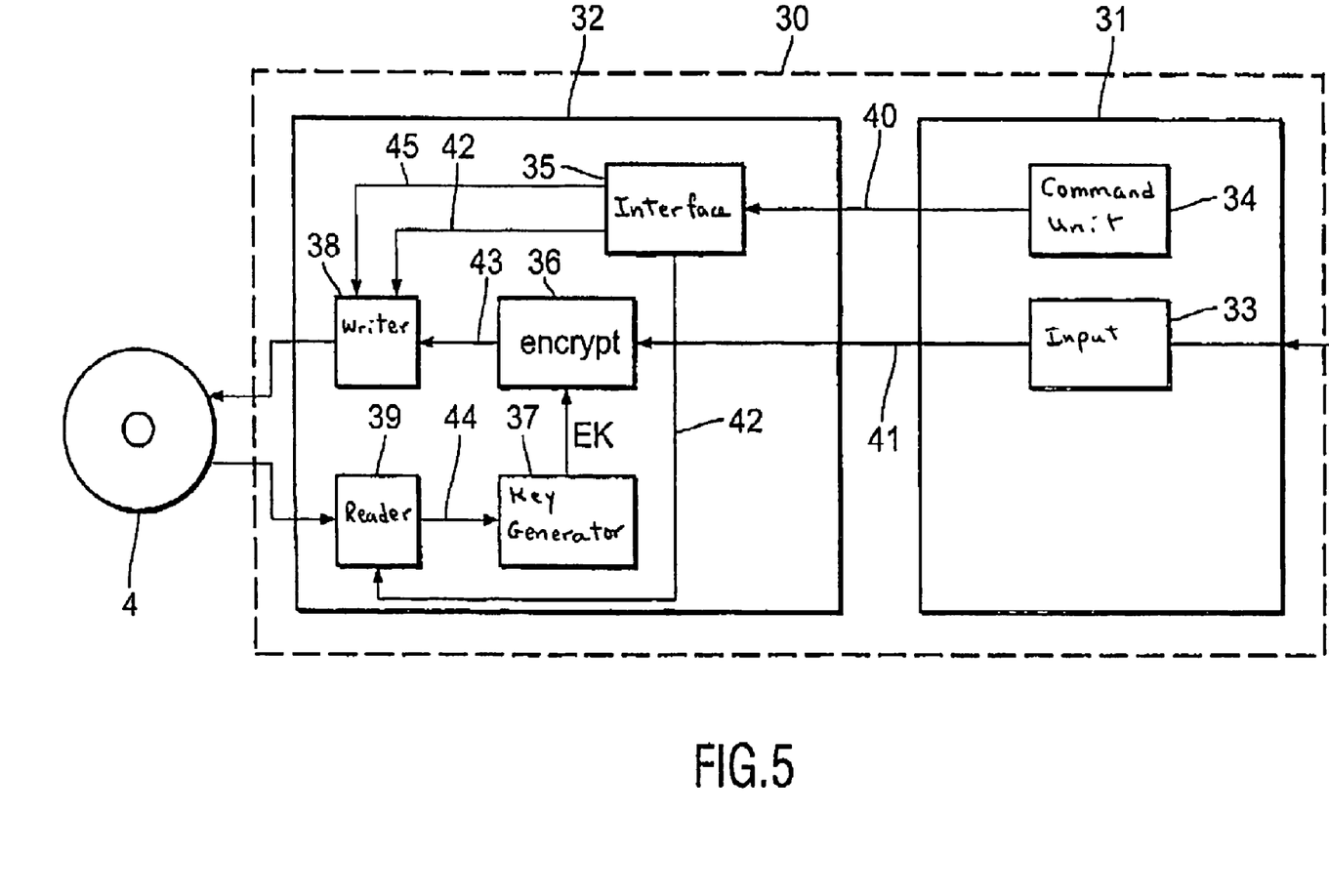
FIG. 5 shows a block diagram of a recording apparatus according to the invention.

A first embodiment of a reproducing apparatus 30 according to the invention comprising an application unit 31 and a drive unit 32, i.e. an apparatus for writing user data, is shown in FIG. 5. Therein an input means 33 of the application unit 31 receives user data to be stored on the medium 4, which user data 41 are transmitted to the drive unit 32 for encryption and storage. In addition, a write command 40 is transmitted from the command unit 34 to the command interface 35 specifying where said user data are to be stored on the medium 4. The location information 45 including the logical block address for the start of writing the encrypted user data 43 is forwarded to the writing means 38.

In order to enable the apparatus for writing 32 to know which key data to use for encrypting the user data 41 before storing it on the medium 4 a key data information 42 is also included in the write command 40. This key data information 42 including a key data identifier is forwarded to reading means 39 for reading the key data indicated by said key data identifier from the medium 4. The read key data 44 are then inputted into the key generation means 37 generating the encryption key EK for encrypting the user data 41 in encryption unit 36.

When finally writing the encrypted user data onto the medium 4, in addition an encryption indicator indicating that said user data are encrypted and the key data identifier 42 are also recorded in the same block or sector in which the related user data are stored.

Instead of reading the required key data from the medium 4 it may also already be included in the write command 40 in encrypted form. It can thus be provided from the command interface 35 to the key generation means 37 generating the encryption key EK for encrypting the received user data 41. It may even be possible that the encryption key EK is included in the write command 40 in the clear which can directly be used by the encryption unit 36 for encryption.

Figure 6:
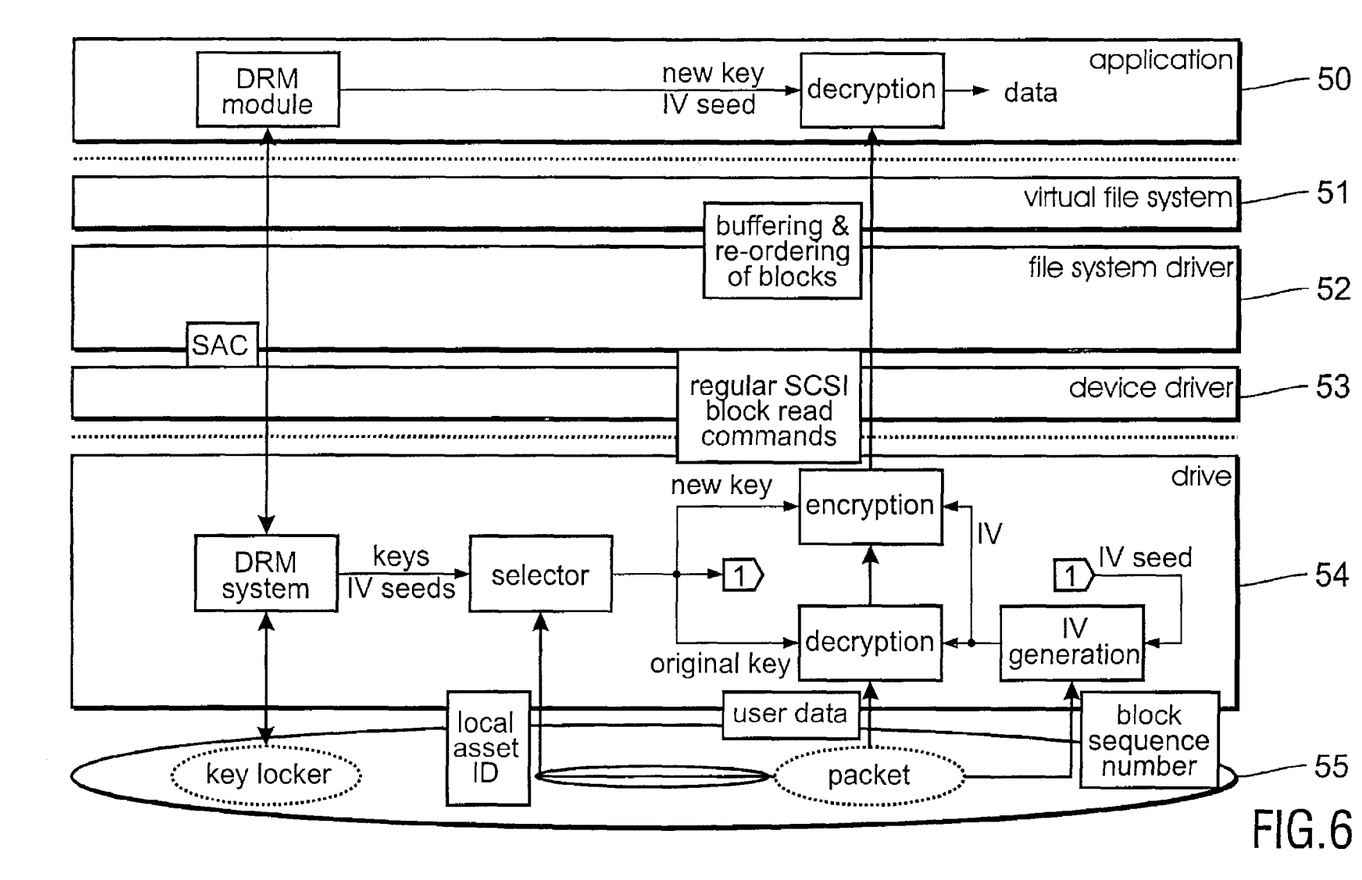
FIG. 6 illustrates the read operation according to the invention.

The method of securely rendering protected content according to the invention shall now be explained with reference to FIG. 6. Therein a system in a PC environment comprising several levels is shown. The first level is the application layer 50 which holds information on files, rights and assets (data). The second level is the file system layer comprising a virtual file system 51, a file system driver 52 and a device driver 53. The virtual file system (VFS) 51 must be considered to be an integral part of the operation system that cannot be changed. As a result any request from the application 50 to the file system driver 52 needs to pass the virtual file system 51 transparently. This means that the interface between an application 50 and the virtual file system 51 cannot be specific to a certain record carrier or standard, and neither can be the interface between the virtual file system 51 and the file system driver 52. The third level is the drive 54 containing the core of the Digital Rights Management (DRM) system. This level holds information on assets, rights and sectors.

In order to read user data the application 50 first retrieves a table of content and queries the DRM system for rights. Thereafter the application 50 locks the asset for reading. The drive 54 generates a new re-encryption key for re-encryption of the user data and the application 50 obtains the new re-encryption key via a secure authenticated channel (SAC). When file data are read by the application 50 an initial vector (IV) info is required for decryption by the drive 54. Therefore a local asset ID stored on the medium 55 is required. Said local asset ID and/or said initial vector are stored in a sub-header or hidden channel on the medium 55. After decryption the application 50 unlocks the asset.

Figure 7:
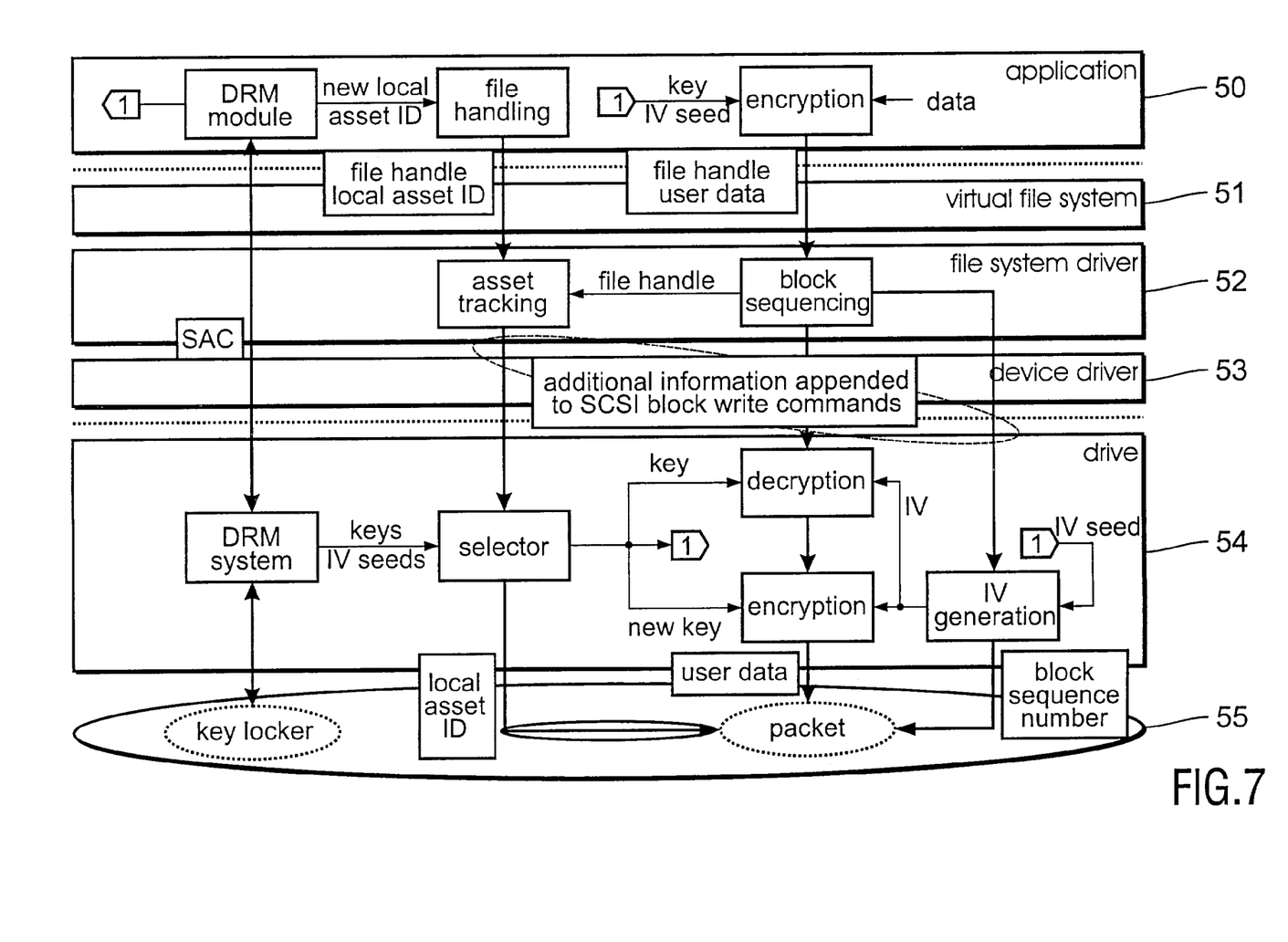
FIG. 7 illustrates the write operation with re-encryption according to the invention and FIG. 8 illustrates the write operation without re-encryption according to the invention.

The method of writing user data including a step of re-encryption is shown in FIG. 7. At first the application 50 locks the asset for writing. Therefore the drive 54 obtains a decryption key via the SAC and generates a new key for storage on the disc 55. The application 50 retrieves a new local asset ID. Thereafter the application 50 opens the file for writing and communicates the local asset ID to the file system driver 52. Still further the application writes the file data thereby appending the re-encryption information to the SCSI write command. Finally the application 50 closes the file and unlocks the asset.

Figure 8:
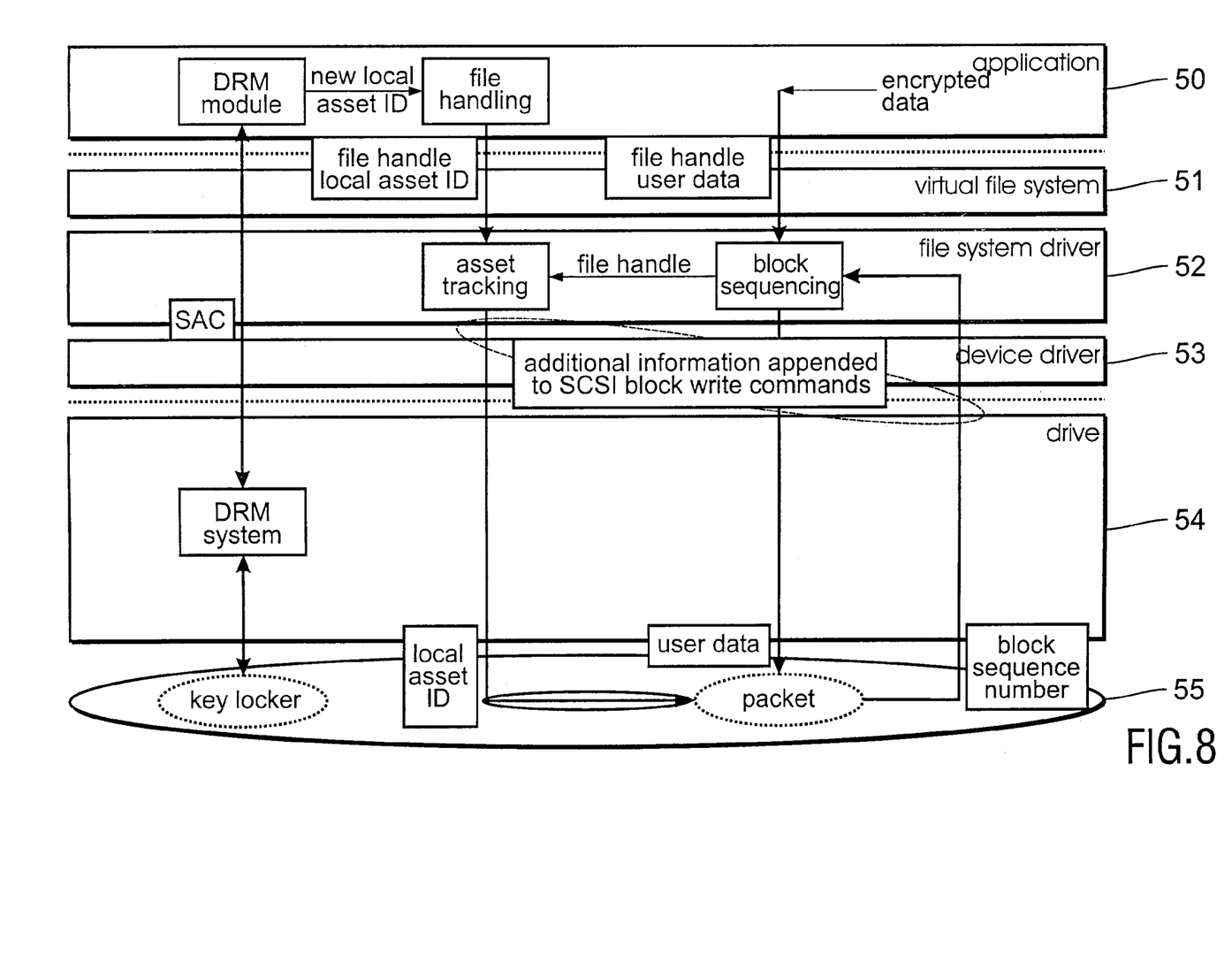

The method of writing user data without re-encryption is shown in FIG. 8. The main steps are identical to the method as illustrated in FIG. 7, however no re-encryption is done, thus avoiding the generation and use of a decryption key for decrypting the user data.

The invention can be applied in any case where access to an entity, e.g. file, comprised of a collection of storage units, i.e. sectors or blocks, is facilitated by (software) layers, i.e. drivers, that translate the original request into a request for arrange of addresses on the storage device and where the properties of or the nature of the requested operation on the accessed entity can be used by the storage device the entity is stored on. This includes the use of storage devices such as optical disc systems and hard disc drives that implement (in the drive) advanced features such as digital rights management or allocation strategies.

The invention claimed is:

1. An apparatus for reading user data comprising files stored block-wise on a storage medium, the storage of which is divided into blocks, and for storing a plurality of keys associated with said files, said apparatus comprising:
   a command interface for receiving and interpreting a read command, said read command including a user data information specifying which file of said files is to be read,
   reading means for reading said file and a related encryption indicator from a block of said storage medium, said encryption indicator indicating if said file is encrypted or not, said reading means being further adapted for reading a related key data identifier specifying which key data of said plurality of keys to use for decrypting said file if said encryption indicator indicates that said file is encrypted, wherein the key data identifier is stored next to the block from which the user data are to be read,
   decryption means for decrypting said user data using said key data, and
   output means for outputting said decrypted user data.

2. The apparatus according to claim 1,
   wherein said key data are stored in encrypted form on said storage medium,
   wherein said reading means are adapted for reading said key data to be used for decrypting said user data, and
   wherein said decryption means are further adapted for decrypting said encrypted key data.

3. The apparatus according to claim 1,
   wherein said read command includes a re-encryption key data information specifying which re-encryption key data to use for re-encrypting said decrypted user data before outputting it, and
   wherein said apparatus further comprises re-encryption means for re-encrypting said decrypted user data before outputting it by said output means.

4. The apparatus according to claim 1, wherein said key data identifier is stored in the header or sub-header of a block storing user data encrypted by use of the key data specified by said key data identifier.

5. The apparatus according to claim 1, wherein said key data identifier is stored in a sub-channel of a main data channel that includes the user data.

6. The apparatus according to claim 1, wherein an initialization vector is stored in the header or sub-header of a block storing related user data in encrypted form.

7. The apparatus according to claim 1, wherein said key data identifier further specifies additional information, in particular rights information, associated with the user data stored in the accessed block.

8. The apparatus according to claim 1, wherein said plurality of keys are stored in a table on said storage medium.

9. The apparatus according to claim 1, wherein said plurality of keys are stored in a look-up table on said storage medium, said look-up table storing different key data for different blocks.

10. A method of reading user data comprising files stored block-wise on a storage medium, the storage of which is divided into blocks, and for reading a plurality of keys stored on said storage medium and associated with said files, said method comprising the acts of;
    receiving and interpreting a read command, said read command including a user data information specifying which file of said files is to be read,
    reading said file and a related encryption indicator from a block of said storage medium, said encryption indicator indicating if said file is encrypted or not, said reading means being further adapted for reading a related key data identifier specifying which key data of said plurality of keys to use for decrypting said user data if said encryption indicator indicates that said file is encrypted, wherein the key data identifier is stored next to the block from which the user data are to be read,
    decrypting said user data using said key data, and
    outputting said decrypted user data.

11. A computer program product stored on a computer readable storage medium, the computer program product comprising computer program code means if or causing a computer to perform the acts of the method as claimed in claim 10 when said computer program is run on a computer.

12. The method according to claim 10, wherein said plurality of keys are stored in a table on said storage medium.

13. The method according to claim 10, wherein said plurality of keys are stored in a look-up table on said storage medium, said look-up table storing different key data for different blocks.

14. An apparatus for writing user data comprising files block-wise onto a storage medium, the storage of which is divided into blocks, and for writing a plurality of keys associated with said files, comprising:

a command interface for receiving and interpreting a write command, said write command including a user data information specifying which file of said files is to be written and a related encryption indicator indicating if said file shall be written in encrypted form or not, encryption means for encrypting said file using key data of said plurality of keys, and writing means for writing said file, said encryption indicator and, if said user data are encrypted, a key data identifier specifying which key data of said plurality of keys to use for encrypting said file, wherein the key data identifier is stored next to a block from which the user data are to be read.

15. The apparatus according to claim 14, wherein said write command includes the key data to be used for encrypting said user data, said key data being included in encrypted form, and wherein said apparatus further comprises key decryption means for decrypting said encrypted key data.

16. The apparatus according to claim 14, wherein said key data are stored in encrypted form on said storage medium, wherein said write command includes said key data identifier identifying the key data to be read from said storage medium and to be used for encrypting said user data, wherein said apparatus further comprises:

reading means for reading said identified key data from said storage medium, and key decryption means for decrypting said encrypted key data.

17. The apparatus according to claim 14, wherein said plurality of keys are stored in a table on said storage medium.

18. The apparatus according to claim 14, wherein said plurality of keys are stored in a look-up table on said storage medium, said look-up table storing different key data for different blocks.

19. A method of writing user data comprising files block-wise onto a storage medium, the storage of which is divided into blocks, and for writing a plurality of keys on said storage medium and associated with said files, said method comprising the acts of:

receiving and interpreting a write command, said write command including a user data information specifying which of said file is to be written and a related encryption indicator indicating if said file shall be written in encrypted form or not, encrypting said file using key data of said plurality of keys and writing said file, said encryption indicator and, if said user data are encrypted, a key data identifier specifying which key data of said plurality of keys to use for encrypting said file, wherein the key data identifier is stored next to a block from which the user data are to be read.

20. The method according to claim 19, wherein said plurality of keys are stored in a table on said storage medium.

21. The method according to claim 19, wherein said plurality of keys are stored in a look-up table on said storage medium, said look-up table storing different key data for different blocks.

22. A storage medium storing files in blocks and storing a plurality of keys associated with said files, said files being selectively stored in encrypted or unencrypted form, further storing in each block an encryption indicator indicating if a tile of said files stored in said block is encrypted or not and a key identifier specifying which key of the plurality of keys is used for encrypting said file if said file is encrypted, wherein the key data identifier is stored next to the block from which the user data are to be read.

23. The storage medium according to claim 22, wherein said plurality of keys are stored in a table on said storage medium.

24. The storage medium according to claim 22, wherein said plurality of keys are stored in a look-up table on said storage medium, said look-up table storing different keys for different blocks.

\* \* \* \* \*